US006044470A

United States Patent [19]

Kuriyama

[11] Patent Number: 6,044,470

[45] Date of Patent: Mar. 28, 2000

[54] IC CARD PORTABLE TERMINAL APPARATUS

[75] Inventor: Ryouichi Kuriyama, Zushi, Japan

[73] Assignee: Kabushiki Kaisha Toshiba, Kawasaki, Japan

[21] Appl. No.: 08/927,041

[22] Filed: Sep. 10, 1997

[30] Foreign Application Priority Data

| | | | |
|---|---|---|---|
| Sep. 12, 1996 | [JP] | Japan | 8-241892 |
| Sep. 12, 1996 | [JP] | Japan | 8-241894 |
| Sep. 26, 1996 | [JP] | Japan | 8-254905 |
| Jan. 30, 1997 | [JP] | Japan | 9-016522 |

[51] Int. Cl.[7] .................... G06F 12/14

[52] U.S. Cl. .................... 713/202; 711/164

[58] Field of Search .................... 713/202; 380/4; 711/164

[56] References Cited

U.S. PATENT DOCUMENTS

| | | | |
|---|---|---|---|
| 4,882,473 | 11/1989 | Bergeron et al. | 463/25 |
| 5,285,055 | 2/1994 | Oonakahara et al. | 235/380 |
| 5,533,125 | 7/1996 | Bensimon et al. | 380/4 |
| 5,590,038 | 12/1996 | Pitroda | 705/41 |
| 5,623,637 | 4/1997 | Jones et al. | 711/164 |
| 5,629,981 | 5/1997 | Nerlikar | 380/25 |
| 5,701,343 | 12/1997 | Takashima | 380/4 |
| 5,825,871 | 10/1998 | Mark | 379/355 |
| 5,884,271 | 3/1999 | Pitroda | 705/1 |

FOREIGN PATENT DOCUMENTS

| | | |
|---|---|---|
| 0 262 025 | 3/1988 | European Pat. Off. . |
| 0 332 117 | 9/1989 | European Pat. Off. . |
| 0 666 550 | 8/1995 | European Pat. Off. . |
| 2 298 505 | 9/1996 | United Kingdom . |
| 95/04328 | 2/1995 | WIPO . |

*Primary Examiner*—Joseph E. Palys
*Assistant Examiner*—Nguyen Xuan Nguyen
*Attorney, Agent, or Firm*—Pillsbury, Madison & Sutro, LLP

[57] ABSTRACT

Password identification information for identifying a password for key verification is set for each of a plurality of applications. A current password storage unit for storing a password which has recently been input and the password identification information of the password is arranged. When one application is selected, password identification information corresponding to the application is verified with the password identification information stored in the current password storage unit. If the two password identification information match, key verification is performed using the password in the current password storage unit. With this operation, a plurality of data can be read out by performing the password input operation once. One or two select keys are arranged in place of a ten-key pad. By repeating an operation using the select keys and the enter key, a password having a plurality of digits is input. Therefore, the password can be input using a minimum number of keys.

17 Claims, 12 Drawing Sheets

| TYPE OF APPLICATION | PASSWORD IDENTIFICATION INFORMATION (32) | PASSWORD INPUT INFORMATION (33) | CLEAR CONTROL INFORMATION (34) |
|---|---|---|---|
| APPLICATION (F1) | 01 | 00 | 00 |
| APPLICATION (F2) | 02 | 01 | 01 |
| ⋮ | ⋮ | ⋮ | ⋮ |
| APPLICATION (Fn-1) | 02 | 01 | 01 |
| APPLICATION (Fn) | 01 | 01 | 00 |

31

| APPLICATION NAME | DATA |
|---|---|
| CREDIT (F1) | CREDIT DATA (D1～D3) |
| PREPAID (F2) | PREPAID DATA (D1～D4) |
| POINT RESERVE (F4) | POINT RESERVE DATA (D1～D3) |
| ⋮ | ⋮ |

40 41

42 43 44

| | | |
|---|---|---|
| READ | F1 | D2 |

IC CARD PORTABLE TERMINAL APPARATUS

BACKGROUND OF THE INVENTION

The present invention relates to an IC card portable terminal apparatus for selectively reading out various transaction data or sum data from an IC card which is used as a credit card or electronic-money and supports a plurality of applications, and displaying the readout data.

Recently, IC cards each incorporating an IC chip having control devices including a ROM (Read Only Memory), a RAM (Random Access Memory), and a CPU (Central Processing Unit) for controlling these memories are used as portable storage media in various industrial fields.

When an IC card of this type is used as a credit card or electronic-money, various transaction data or sum data stored in the card can be conveniently selectively read out and displayed, as needed.

For this purpose, an IC card portable terminal apparatus that a user can always carry has recently been developed. The IC card portable terminal apparatus is compact and lightweight, like the IC card, and has a keyboard, a liquid crystal display unit, and a battery serving as a power supply for the self operation and the IC card. Upon inserting an IC card into the apparatus, various transaction data or sum data is selectively read out from the IC card in accordance with keyboard operations and displayed on the liquid crystal display unit.

In such an IC card portable terminal apparatus, when data is to be read out from an IC card which supports a plurality of applications and for which a password is set, generally, key verification or authentication must be performed in units of applications or every time data is to be read out. In this case, even when passwords for key verification necessary to read out data are identical, the password must be input every time data is to be read out. For this reason, the apparatus requires cumbersome operations, and is inconvenient to use.

The IC card portable terminal apparatus for handling an IC card which supports a plurality of applications can support only a limited number of applications. When an application to be supported is added on the IC card, the data of the added application cannot be read out unless the control program is changed/added on the portable terminal side. The control unit of such a portable terminal apparatus is generally formed as an IC, and change/addition of the control unit is virtually impossible. Therefore, no application can be easily added on the IC card side.

In addition, in such an IC card portable terminal apparatus, when necessary data is to be read out from an IC card, and a password (e.g., a password number) for key verification must be input to read out an application, the apparatus must be equipped with a ten-key pad for inputting the password. This impedes not only size reduction of the keyboard unit but also size reduction of the apparatus main body.

BRIEF SUMMARY OF THE INVENTION

It is an object of the present invention to provide an IC card portable terminal apparatus which can read out a plurality of data by inputting a password once as far as passwords necessary to read out data are identical and freely set in units of applications whether the password input operation must be performed every time data is to be read out to largely improve the convenience, and a key verification method therefor.

It is another object of the present invention to provide an IC card portable terminal apparatus capable of easily adding an application on the IC card side without changing/adding the control program on the portable terminal side.

It is still another object of the present invention to provide an IC card portable terminal apparatus capable of inputting a password using a minimum number of keys instead of a large number of operating keys including a ten-key pad.

It is still another object of the present invention to provide a key verification method for an IC card portable terminal apparatus capable of easily inputting a password using a minimum number of keys in a short time without using a large number of operating keys including a ten-key pad.

In order to achieve the above object, according to the first aspect of the present invention, password identification information for identifying a password for key verification is set for each of a plurality of applications (data). A current password storage unit for storing a password which has recently been input and the password identification information of the password is arranged. When one application is selected, password identification information corresponding to the selected application is compared with the password identification information stored in the current password storage unit. If the two password identification information match, key verification is performed using the password in the current password storage unit. Therefore, there are provided an IC card portable terminal apparatus which can read out the plurality of data by inputting a password once when identical passwords must be input every time data is to be read out from the IC card, thereby largely improving convenience, and a key verification method therefor.

In addition, according to the first aspect of the present invention, password input information representing whether a password needs to be input every time data in the IC card is to be read out is set for each application. When one of the plurality of applications is selected, password input information corresponding to the selected application is referred to. If the application requires a password input every time, the password is input using password input means such as a keyboard every time. If the application does not require a password input every time, password identification information corresponding to the application is compared with password identification information in the current password storage unit. If the two password identification information agree, the password in the current password storage unit is used for key verification. The password need not be input using the keyboard or the like every time data is to be read out. Therefore, there are provided an IC card portable terminal apparatus which can freely set whether a password must be input every time data is to be read out, thereby largely improving convenience, and a key verification method therefor.

According to the second aspect of the present invention, a plurality of pieces of application identification information corresponding to a plurality of applications supported by an IC card are read out from the IC card to a portable terminal apparatus. One of the applications is selected on the basis of the plurality of pieces of readout application identification information. The data of the selected application is read out from the IC card using the readout application identification information. Therefore, there is provided an IC card portable terminal apparatus capable of reading out data associated with an application added on the IC card side without changing the control program itself of the IC card portable terminal.

According to the third aspect of the present invention, when a password for key verification is to be input, an initial value "0" is displayed on a display unit first. Next, every time a select key is depressed, the displayed value changes. After the select key is depressed, the enter key is depressed. With this operation, the displayed value at that time is stored in a RAM. By repeating the operation using the select key and the enter key, a password having a plurality of digits for key verification is input. Therefore, the password can be input using a minimum number of keys (in this example, three keys) without using a ten-key pad, unlike the prior art. Therefore, the IC card portable terminal apparatus can be made compact.

According to the fourth aspect of the present invention, when the number of input digits of a password reaches a predetermined input digit reference value, a specific character "E" representing the end of input is displayed on a display unit. When a password having a predetermined number of digits is input, the user is advised that the password input operation can be ended. Therefore, the password can be easily and quickly input and determined.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be described below with reference to the accompanying drawing.

Figure 1:
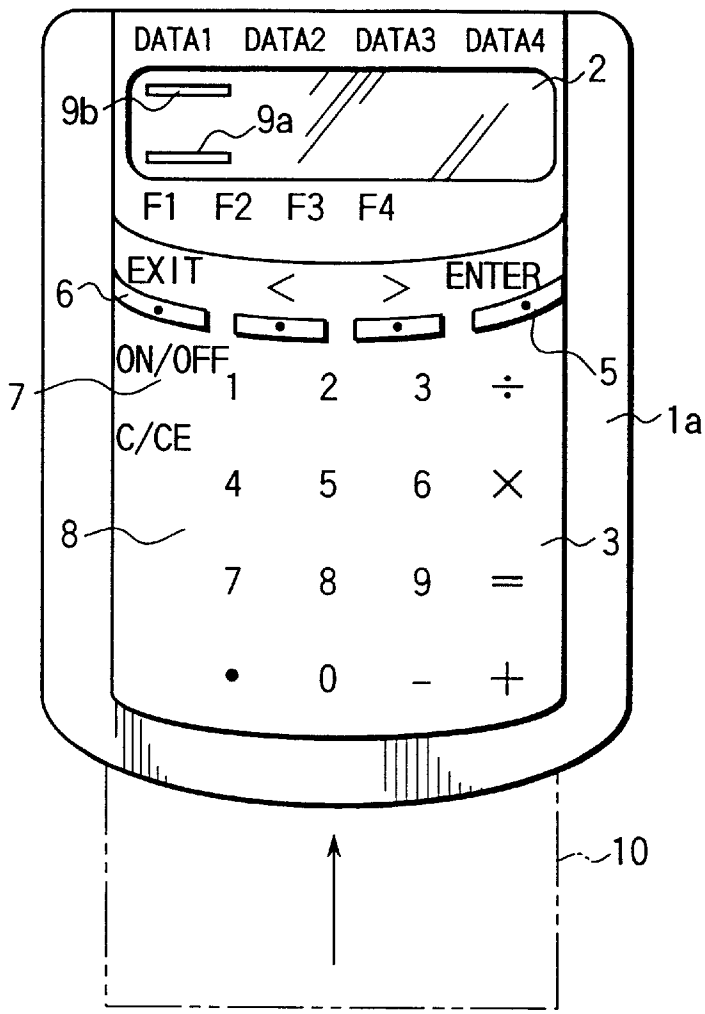
FIG. 1 is a plan view schematically showing the outer appearance of an IC card portable terminal apparatus according to the first embodiment of the present invention.

FIG. 1 is a plan view schematically showing the outer appearance of an IC card portable terminal apparatus 1*a* according to the first embodiment of the present invention. The IC card portable terminal apparatus 1*a* is formed into, e.g., a card shape and has, on its surface, a liquid crystal display unit 2 serving as a display means for displaying various data, and a keyboard 3 serving as an input means for inputting a password or other data.

The keyboard 3 has select keys 4*a* and 4*b*, an enter (OK) key 5, an exit key 6 which is depressed to display the next display screen, a power on/off key 7, and a ten-key pad 8. An application or data to be read out is selected by moving a cursor 9*a* or 9*b* displayed on the display unit 2 using the select keys 4*a* and 4*b*. The select key 4*a* moves the cursor 9*a* or 9*b* to the right, and the select key 4*b* moves the cursor 9*a* or 9*b* to the left.

Figure 2:
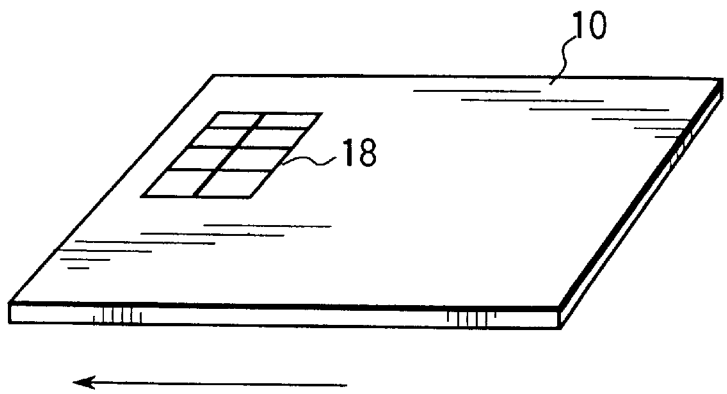
FIG. 2 is a perspective view schematically showing the outer appearance of an IC card.

A card insertion portion (not shown) is formed on one side surface (side surface along the short-side direction) of the IC card portable terminal apparatus 1*a* to receive and set an IC card 10 as a storage medium. The IC card 10 supports a plurality of applications including, e.g., a credit card, a prepaid card, and a point reserve function. In this point reserve system, a service point based on the sum of shopping is reserved, and a service according to the reserved point is provided to the client. The IC card 10 has, at a predetermined portion of one surface, a contact portion 18 electrically connected to the interface unit (to be described later) of the IC card portable terminal By apparatus l*a*, as shown in FIG. 2. The IC card 10 is inserted in a direction indicated by an arrow in FIG. 2 from the side of the contact portion 18.

Figure 3:
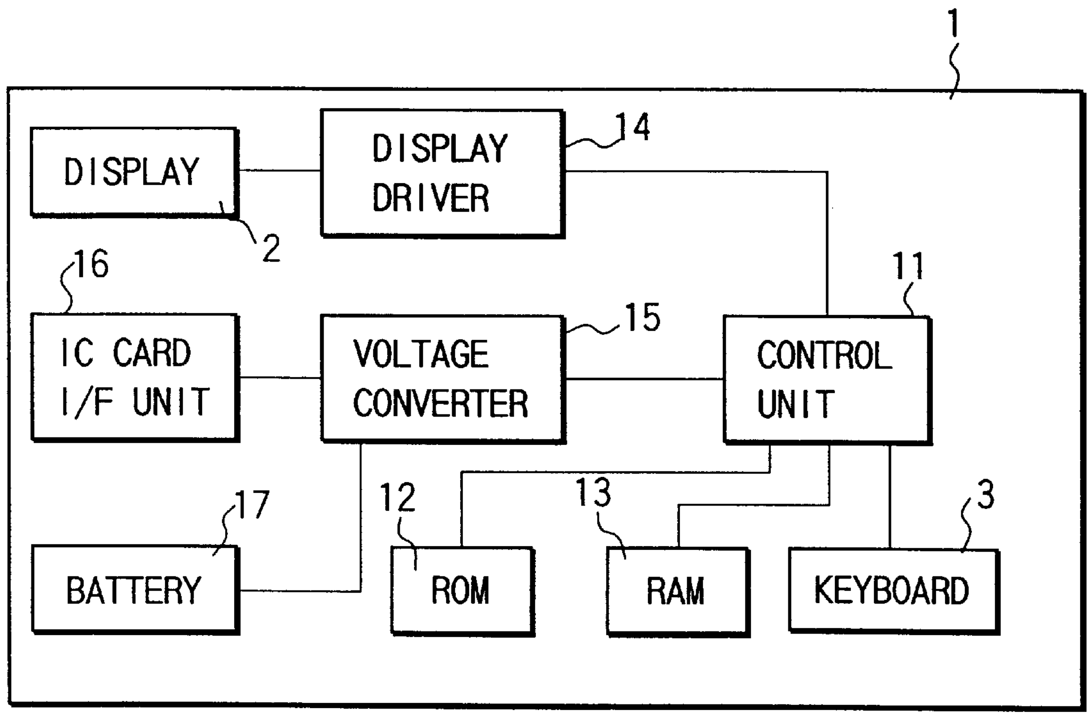
FIG. 3 is a block diagram schematically showing the arrangement of the IC card portable terminal apparatus.

FIG. 3 is a block diagram schematically showing the arrangement of the IC card portable terminal apparatus 1*a*. A control unit 11 for controlling the entire apparatus is mainly constituted by a CPU. The control unit 11 is connected to a ROM (Read Only Memory) 12 serving as a storage means storing a control program and an application table (to be described later), a RAM (Random Access Memory) 13 serving as a storage means used as a word memory or the like, a display driver 14 for driving/controlling the display unit 2, an IC card driving voltage converter 15, and the keyboard 3.

The voltage converter 15 converts the power and signal voltage for an IC card I/F unit 16 from a low voltage (+3V) as the output voltage of a battery 17 into a specific voltage (+5V) for the IC card. The voltage converter 15 is also connected to the IC card interface (I/F) unit 16 for transmitting/receiving a signal to/from the IC card 10 through the contact portion 18, and the battery 17 as a power supply unit. In this embodiment, a battery whose output voltage is 3V is used as the battery 17.

Figure 4:
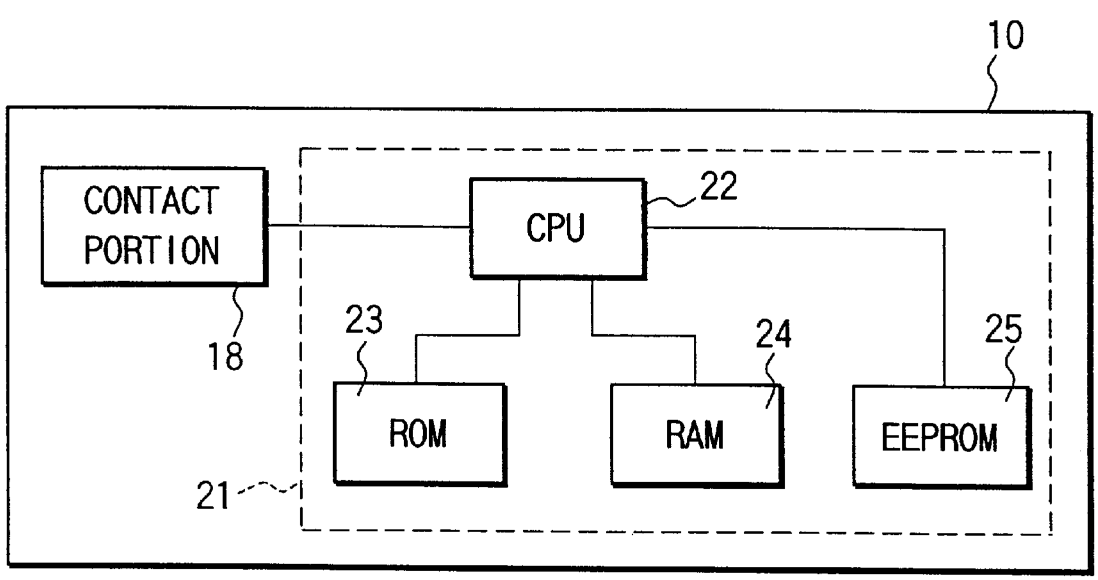
FIG. 4 is a block diagram schematically showing the arrangement of the IC card.

FIG. 4 is a block diagram schematically showing the arrangement of the IC card 10. The IC card 10 includes the contact portion 18 and an IC chip 21. The IC chip 21 comprises a CPU 22 as a control device, a ROM 23 storing the control program of the CPU 22, a RAM 24 serving as a work memory, and an EEPROM 25 as a nonvolatile memory for storing data.

Figures 5, 6:
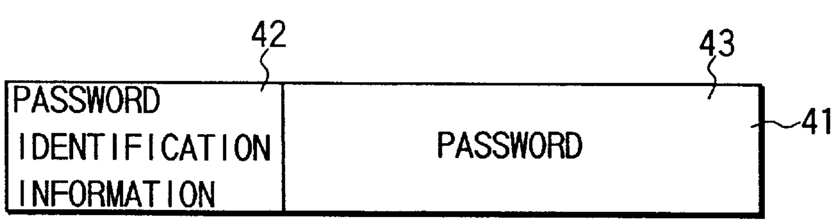
FIG. 5 is a view showing an application table arranged in the ROM of the IC card portable terminal apparatus.
FIG. 6 is a view showing current password information stored in the RAM of the IC card portable terminal apparatus.

FIG. 5 shows the arrangement of an application table 31 arranged in the ROM 12. The application table 31 stores password identification information 32, password input information 33, and clear control information 34 for each of the plurality of applications supported by the IC card 10.

The password identification information 32 is information for identifying a password set for each application for key verification. When identical passwords are used for different applications, identical password identification information are assigned to these passwords. The password input information 33 represents whether a password must be input every time data is to be read out. If the password input information 33 has a value "01", a password must be input. If "00", a password need not be input. The clear control information 34 represents whether current password information (to be described later) is to be cleared upon turning on the power supply of the apparatus. If the clear control information 34 has a value "00", the current password information is cleared. If "01", the current password C) information is not cleared.

FIG. 6 shows current password information 41 stored in the RAM 13. The current password information 41 comprises password identification information 42 of a password used for previous key verification, and a password 43 which has been input at that time.

Figure 7:
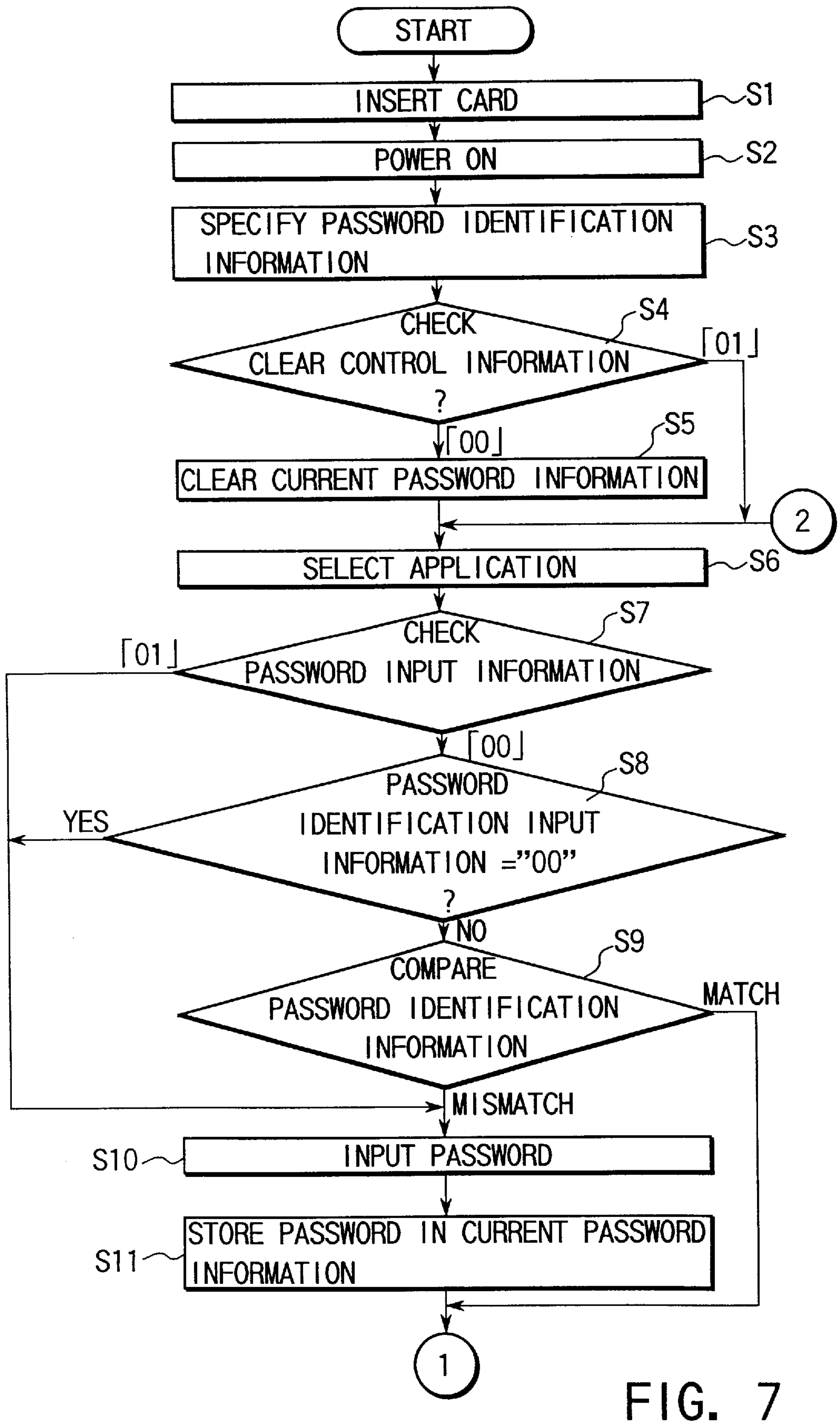
FIG. 7 is a flow chart for explaining a data read from the IC card according to the first embodiment of the present invention.
Figure 8:
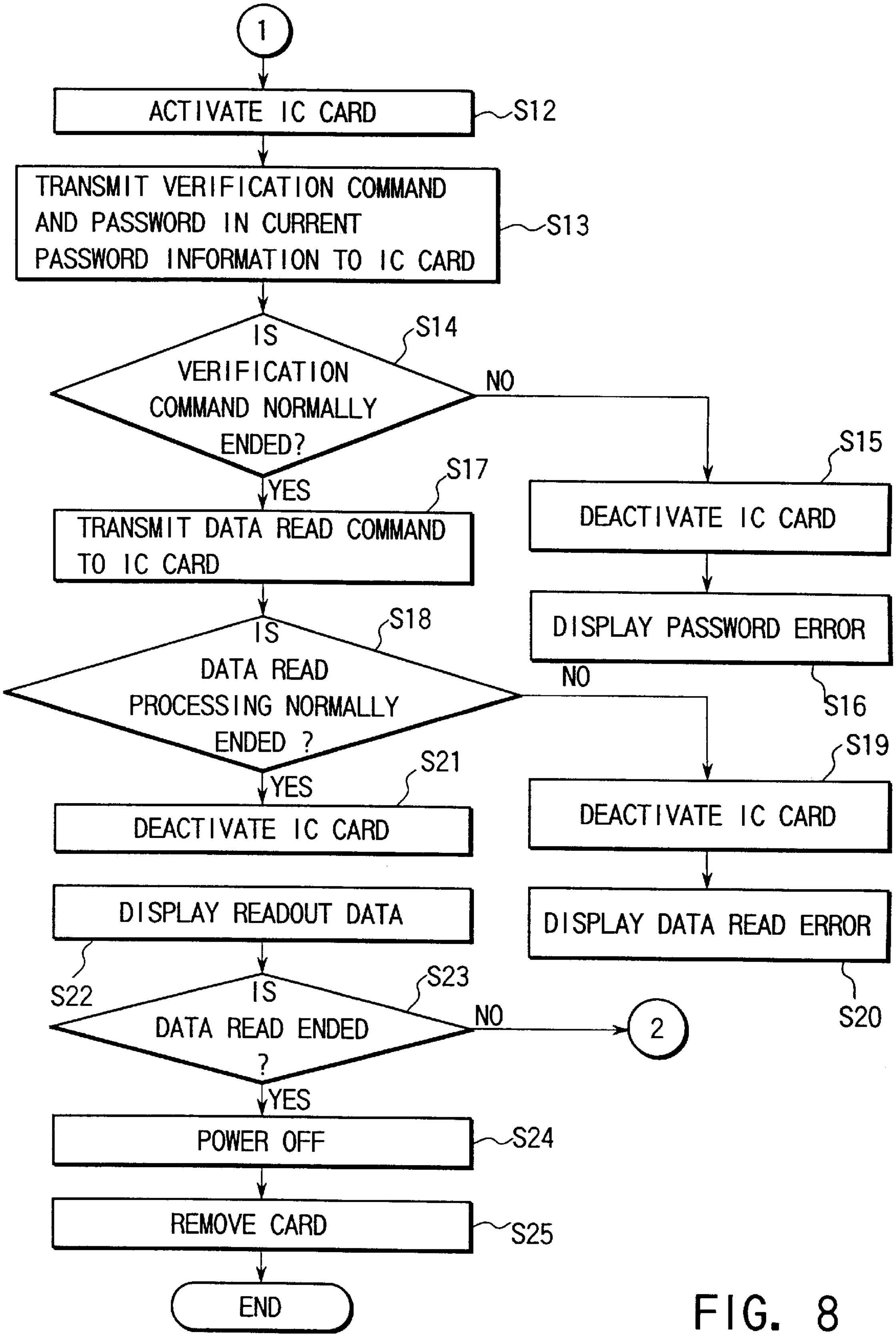
FIG. 8 is a flow chart for explaining the data read from the IC card according to the first embodiment of the present invention.

A data read from the IC card 10 with the above arrangement will be described next with reference to the flow charts shown in FIGS. 7 and 8.

When data is to be read out from the IC card 10, the IC card 10 is inserted from the card insertion portion and set at a predetermined position (S1), as shown in FIG. 1. Next, the power on/off key 7 in the keyboard 3 is depressed to turn on the power supply (S2).

When the power supply is turned on, the control unit 11 searches the application table 31 for password identification information 32 having the same value as that of the password identification information 42 in the current password information 41 (S3). The control unit 11 checks the value of the clear control information 34 corresponding to the found password identification information 32 (S4).

If this check indicates that the value of the clear control information 34 is "00", the control unit 11 clears the current password information 41 (S5), and the flow advances to step S6. If "01", the current password information 41 is not cleared, and the flow advances to step S6.

In step S6, the control unit 11 displays a menu screen for selecting an application on the display unit 2. The user selects the application of the data to be read out on this menu screen (S6). More specifically, the cursor **9*a* is moved using the select key 4*a* or 4*b* to select a desired application, and the enter key 5 is depressed. Next, the cursor 9*b* is moved using the select key 4*a* or 4*b* again to select data to be read out, and the enter key 5 is depressed. In this example, four applications (F1 to F4) can be selected, and four data (DATA1 to DATA4**) can be selected for each application.

When the application and data to be read out are selected, the control unit 11 checks the value of the password input information 33 in the application table 31, which corresponds to the application selected in step S6 (S7).

If this check reveals that the value of the password input information 33 is "00", i.e., if the password input operation need not be performed every time data is to be read out, the control unit 11 checks whether the password identification information 42 is stored in the current password information 41 (S8). If the current password information 41 has been cleared in step S5, the password identification information 42 is set at "00".

If this check shows that the password identification information 42 has a value other than "00", i.e., the password identification information 42 is stored in the current password information 41, the control unit 11 compares the password identification information 42 with the password identification information 32 corresponding to the application selected in step S6 (S9).

If this comparison reveals that the two password identification information do not match, or if the check in step S7 indicates that the value of the password input information 33 is "00", or if it is found in step S8 that the value of the password identification information 42 is "00"(i.e., the current password information has been cleared), the control unit 11 displays a password input screen on the display unit 2. The user inputs a password (e.g., a password number having four digits) on this password input screen using the ten-key pad 8 in the keyboard 3, and finally depresses the enter key 5 (S10). When the clear control information 34 is set at "00"for all the applications, the password for each application must be input at least once upon turning on the power supply.

When the enter key 5 is depressed, the control unit 11 rewrites the value of the password 43 in the current password information 41 to the value of the password which has been input. The control unit 11 searches the application table 31 for password identification information 32 corresponding to the application selected in step S6, and stores the found identification information in the current password information 41 as the password identification information 42. In this way, the current value is stored in the current password information 41 (S11).

When processing in step S11 is complete, or when the comparison in step S8 reveals a match between the two password identification information, the control unit 11 activates the IC card 10 and waits for initial response data from the IC card 10 (S12).

Upon normally receiving the initial response data from the IC card 10, the control unit 11 transmits a key verification command and the password 43 in the current password information 41 to the IC card 10 (S13). As a result, key verification processing (password verification) is performed in the IC card 10.

More specifically, in the IC card 10, the CPU 22 verifies the password received from the IC card portable terminal apparatus 1*a* using that stored in the EEPROM 25 in advance and transmits the verification result to the IC card portable terminal apparatus 1*a*.

If an error (password mismatch) is generated in this key verification processing (S14), the control unit 11 deactivates the IC card 10 (S15). The control unit 11 displays a message representing a password error on the display unit 2 (S16).

When the key verification processing (S14) is normally ended (password match), the control unit 11 transmits a read command for reading the data of the application selected in step S6 to the IC card 10 (S17) to read out desired data from the EEPROM 25 of the IC card 10, and temporarily stores the readout data in the RAM 13.

If an error is generated in this read processing (S18), the control unit 11 deactivates the IC card 10 (S19). The control unit 11 displays a message representing a data read error on the display unit 2 (S20).

Upon normally completing the read processing (S18) as well, the control unit 11 deactivates the IC card 10 (S21). The control unit 11 sends the data read out from the IC card 10 and temporarily stored in the RAM 13 to the display unit 2, so that the display unit 2 displays the readout data (S22).

When the power on/off key 7 is depressed, the power supply is turned off (S24). The IC card 10 is removed from the IC card portable terminal apparatus 1*a* (S25).

According to this embodiment, an IC card portable terminal apparatus which requires to input a password once when identical passwords must be input every time one of a plurality of data stored in the IC card is to be read out, thereby largely improving convenience, and a key verification method therefor are provided.

According to this embodiment, an IC card portable terminal apparatus which can freely set whether a password must be input every time one of the plurality of data stored in the IC card is to be read out, thereby largely improving convenience, and a key verification method therefor are provided.

The second embodiment of the present invention associated with selection of an application will be described next. The outer appearance and arrangement of an IC card portable terminal apparatus according to the second embodiment are the same as those of the first embodiment, and a detailed description thereof will be omitted.

Figures 9, 10, 13:
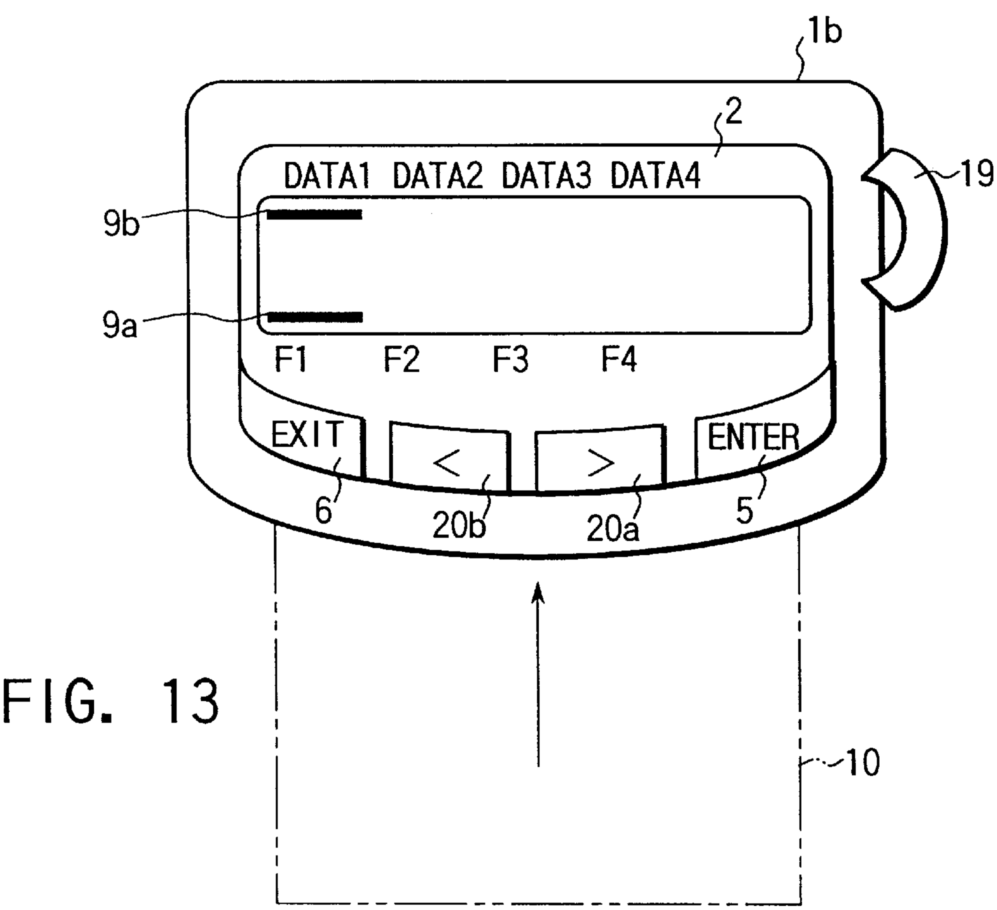
FIG. 9 is a view schematically showing the memory map of an IC card.
FIG. 10 is a view schematically showing the data format of a data read command.
FIG. 13 is a plan view schematically showing the outer appearance of an IC card portable terminal apparatus according to the third embodiment of the present invention.

A plurality of applications supported by an IC card 10 are generally stored in an EEPROM 25, as shown in FIG. 9. In this example, "credit", "prepaid", and "point reserve" are set as applications. Reference numeral 40 denotes an application name storage unit; and 41, an application data storage unit for storing data used in each application. Reference symbols F1, F2, . . . denote application identifiers; and D1, D2, . . . , application data identifiers.

When an IC card portable terminal 1*a* is to read data stored in the IC card, at least a "read command", an "application identifier", and an "application data identifier" are necessary.

FIG. 10 schematically shows the data format of the read command as an example of a command. In FIG. 10, 34 reference numeral 42 denotes a command name; 43, an application identifier; and 44, an application data identifier. The IC card portable terminal 1*a* specifies an application on the basis of the application identifier 43 and specifies stored data for each application on the basis of the application data identifier 44.

Figure 11:
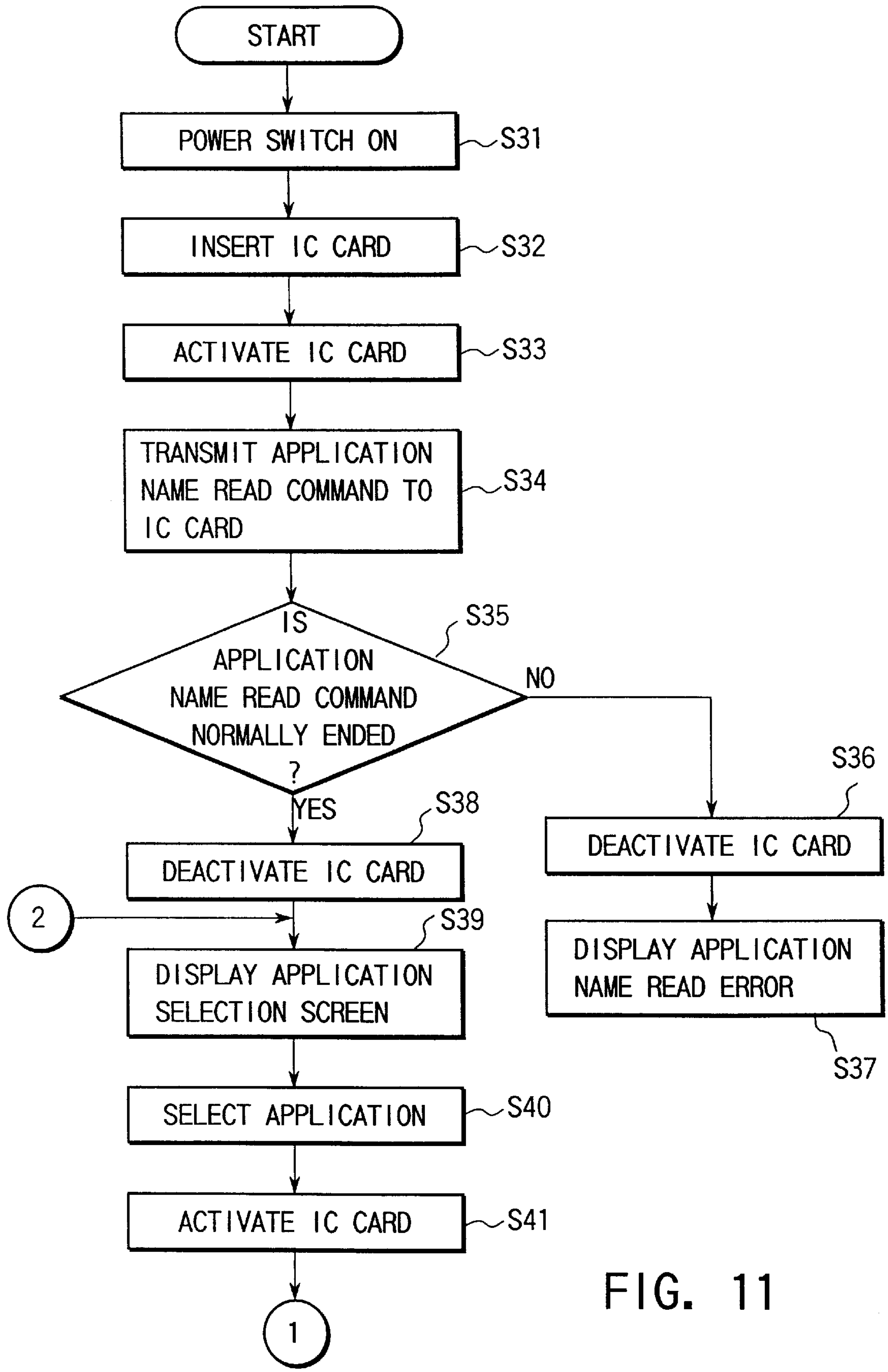
FIG. 11 is a flow chart for explaining a data read from the IC card according to the second embodiment of the present invention.
Figure 12:
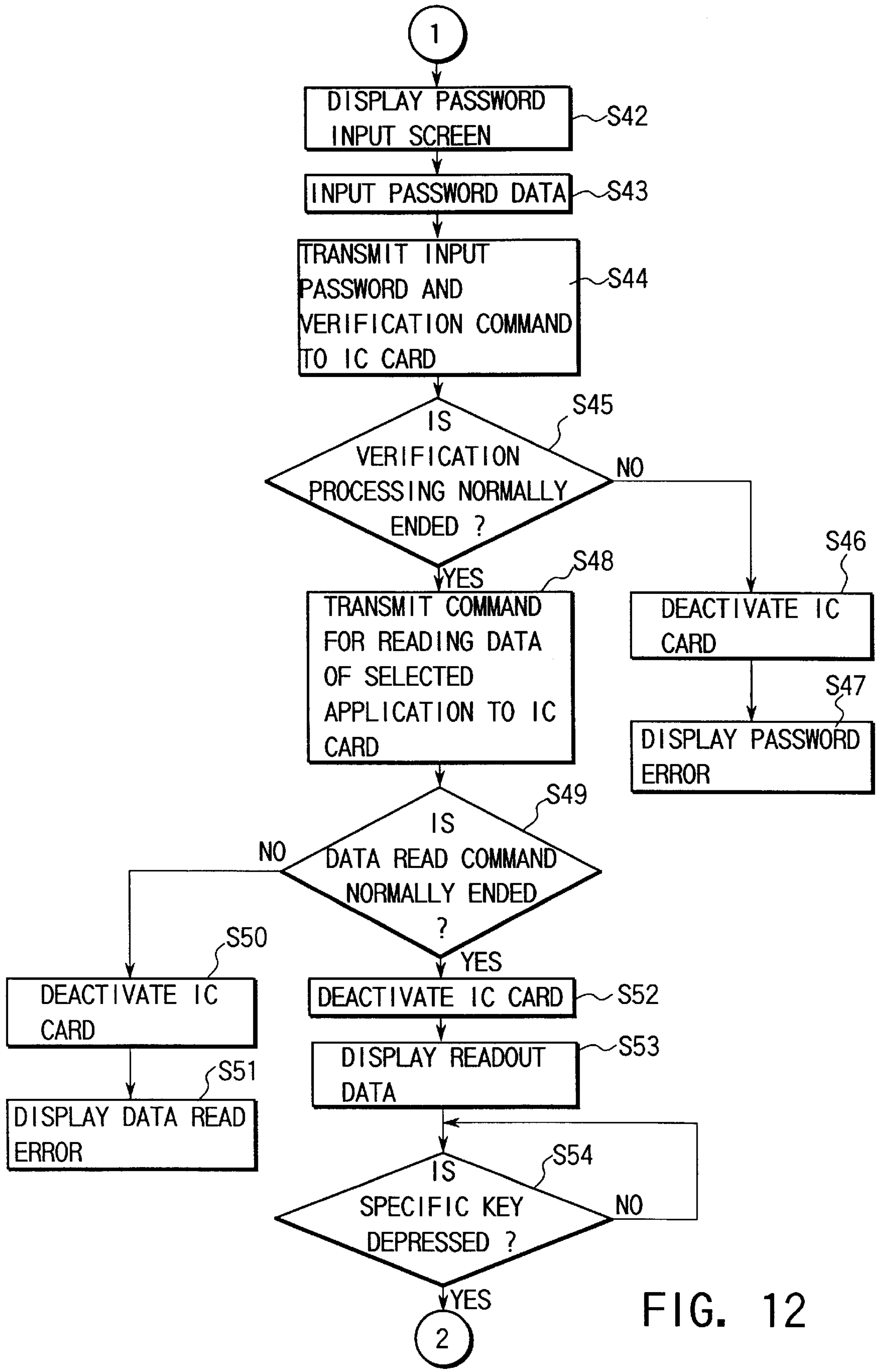
FIG. 12 is a flow chart for explaining the data read from the IC card according to the second embodiment of the present invention.

In the arrangement shown in FIGS. 1 to 4, the operation according to the second embodiment of the present invention will be described next with reference to the flow charts shown in FIGS. 11 and 12. FIGS. 11 and 12 are flow charts showing a data read from the IC card 10.

When application data stored in the IC card 10 is to be read out, the IC card 10 is inserted into a card insertion portion 4 and set at a predetermined position (S31). When the IC card 10 is set at a predetermined position, a mechanical power switch (not shown) arranged in the apparatus is turned on (S32), so that the IC card portable terminal apparatus 1*a* is set in the ON state. In the ON state, a control unit 11 activates the IC card 10 and waits for initial response data from the IC card 10 (S33).

Upon normally receiving the initial response data from the IC card 10, the control unit 11 transmits an application name read command to the IC card 10. The IC card 10 reads out all application names (i.e., all application identifiers) of the supported applications from the application name storage unit 40 of the EEPROM 25 and transmits the application names to the portable terminal 1*a*. The portable terminal 1*a* temporarily stores the received application names in a RAM 13 (S34).

If an error is generated in this application name read processing (S35), the control unit 11 deactivates the IC card 10 (S36). The control unit 11 displays a message representing an application name read error on a display unit 2 (S37).

Upon normally completing the application name read processing (S35) as well, the control unit 11 deactivates the IC card 10 (S38). Thereafter, the control unit 11 displays an application selection screen as shown in FIG. 1 on a display unit 2 (S39).

The user moves a cursor 9*a* on this application selection screen using a select key 4*a* or 4*b* and depresses an enter key 5 to select a desired application (S40). At this time, the cursor 9*a* skips applications which are not supported by the IC card 10. For example, when the applications supported by the IC card 10 are "credit" (F1), "prepaid" (F2), and "point reserve" (F4), as shown in FIG. 9, the cursor 9*a* skips F3 on the display unit 2 shown in FIG. 1. More specifically, when the select key 4*a* is used, the cursor 9*a* jumps from F2 to F4. When the select key 4*b* is used, the cursor 9*a* jumps from F4 to F2.

When the application is selected, the control unit 11 activates the IC card 10 (S41). Thereafter, the control unit 11 displays a password input screen on the display unit 2 (S42). On this password input screen, the user inputs a password (e.g., a password number) for key verification from a keyboard 3 (S43).

When a password is input, the control unit 11 transmits a key verification command to the IC card 10 in accordance with the input password to cause the IC card 10 to perform key verification processing (password verification) (S44).

If an error is generated in this key verification processing (S45), the control unit 11 deactivates the IC card 10 (S46) and displays a message representing a password error on the display unit 2 (S47).

Upon normally completing the key verification processing (S4), the control unit 11 transmits a data read command as shown in FIG. 10 to the IC card 10. In this example, "credit" (F1) is designated as an application, and the data D2 is designated as application data. This "credit" is the application selected in step S40. When "prepaid" is to be designated as an application, F2 is set as the application identifier 43.

In the second embodiment, even when an application supported by the IC card is added, the portable terminal 1*a* can read out the name of the added application from the IC card and recognize the application. That is, use of the added application is enabled only by changing the application identifier 43 to the recognized application identifier without changing the control program of the portable terminal 1*a*.

Upon receiving the read command from the IC card portable terminal 1*a*, the IC card 10 reads out the application data D2 of the designated application (F1) from the EEPROM 25 and transmits the application data D2 to the portable terminal 1*a*. The IC card portable terminal 1*a* receives the application data D2 and stores the data in the RAM 13 (S48).

If an error is generated in this data read processing (S49), the control unit 11 deactivates the IC card 10 (S50) and displays a message representing a data read error on the display unit 2 (S51).

Upon normally completing the data read processing (S49) as well, the control unit 11 deactivates the IC card 10 (S52). Thereafter, the control unit 11 displays the data read out from the IC card 10 and stored in the RAM 13 on the display unit 2 (S53).

When the selected application is "credit", a plurality of credit transaction data are read out from the IC card 10 and temporarily stored in the RAM 13 in the read processing. The data are sequentially selected and read out from the RAM 13 by making a selection using the keyboard 3. The readout transaction data are displayed on the display unit 2.

When the selected application is "point reserve", a service point based on the sum of shopping is input from the keyboard 3 by a clerk, and the input point data is stored in the IC card 10.

When the selected application is "prepaid", balance data of the prepaid card is read out from the IC card 10 and temporarily stored in the RAM 13. The balance data is read out from the RAM 13 and displayed on the display unit 2.

In addition, a predetermined key operation can be performed on the keyboard 3 to perform calculation for the data in the RAM 13 on the basis of a specific algorithm, and the calculation result can be displayed on the display unit 2.

After the data read out from the IC card 10 is displayed on the display unit 2, a predetermined specific key of the keyboard 3 is depressed (S54). With this operation, the flow returns to step S39. The application selection screen is displayed on the display unit 2 again, and processing waits for selection of the next application.

When the IC card 10 is removed from the IC card portable terminal apparatus 1*a*, the power switch is automatically turned off, so that the IC card portable terminal apparatus 1*a* is automatically set in the OFF state.

According to the second embodiment, application identifiers corresponding to the plurality of applications supported by the IC card are read out from the IC card. One of the plurality of application identifiers read out from the IC card is selected, and desired data is read out. Therefore, an IC card portable terminal apparatus capable of easily reading out application data without changing the control program itself of the IC card portable terminal even when an application is added on the IC card side can be provided.

The third embodiment of the present invention will be described below. The IC card portable terminal apparatus 1*a* of the first and second embodiments has a number of operating keys including the ten-key pad 8. In the IC card portable terminal apparatus of the third embodiment, a password can be input using a minimum number of keys. More specifically, an IC card portable terminal 1*b* according to this embodiment uses select keys 20*a* and 20*b* instead of the ten-key pad 8 to input a password, unlike the above embodiments.

FIG. 13 schematically shows the outer appearance of the IC card portable terminal apparatus 1*b* according to the third embodiment. The same reference numerals as in the IC card portable terminal apparatus 1*a* shown in FIG. 1 denote the same parts in FIG. 13, and a detailed description thereof will be omitted. The IC card portable terminal apparatus 1*b* is formed into the shape of a so-called pager and has, on its surface, a liquid crystal display unit 2 serving as a display means for displaying various data, the select keys 20*a* and 20*b* as the first key unit, an enter (OK) key 4 as the second key unit, and an exit key 5 which is depressed to display the next display screen.

The select keys 20*a* and 20*b* are used to input a password and also used to move a cursor 9*a* or 9*b* displayed on the display unit 2 and select an application or data to be read out. A card insertion portion (not shown) for receiving and setting an IC card 10 is formed on one side surface (side surface along the longitudinal direction) of the IC card portable terminal apparatus 1*b*.

The outer appearance and arrangement of the IC card applied to the IC card portable terminal apparatus 1*b* are the same as those of the IC card 10 shown in FIGS. 2 and 4, and a detailed description thereof will be omitted.

Figure 14:
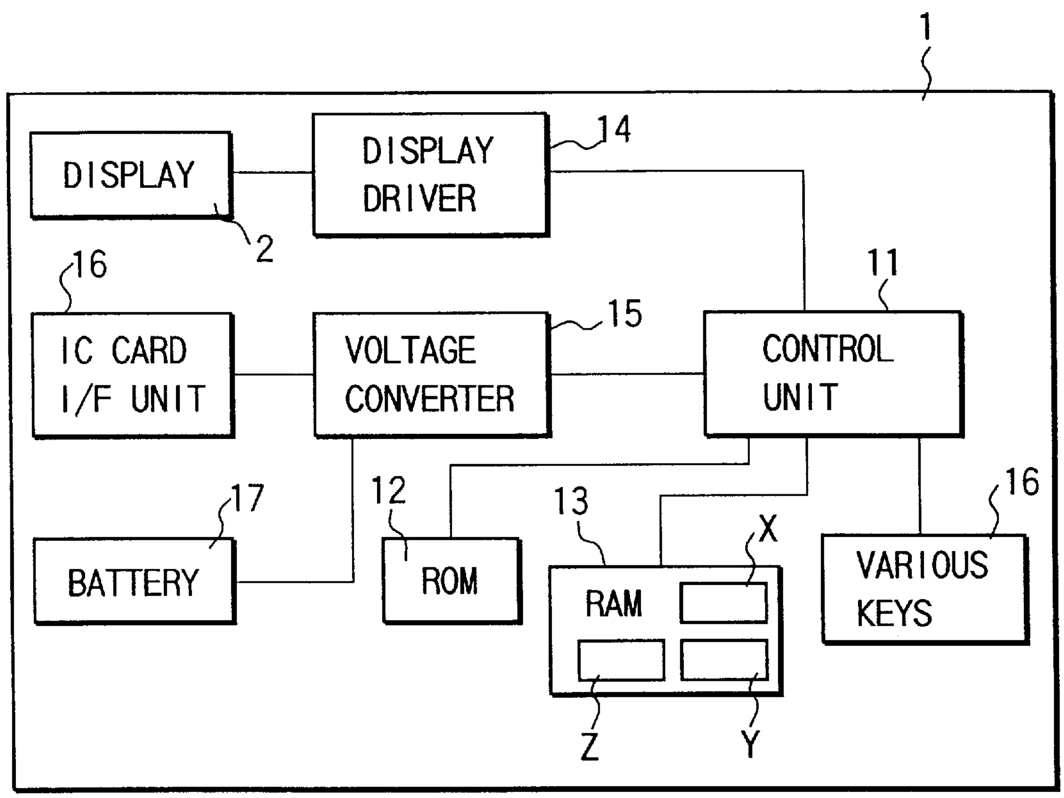
FIG. 14 is a block diagram schematically showing the arrangement of the IC card portable terminal apparatus according to the present invention.

FIG. 14 schematically shows the arrangement of the IC card portable terminal apparatus 1*b* which basically has the same arrangement as that of the IC card portable terminal apparatus 1*a* shown in FIG. 3. A control unit 11 for controlling the entire apparatus is mainly constituted by a CPU. The control unit 11 is connected to a ROM (Read Only Memory) 12 storing a control program and the like, a RAM (Random Access Memory) 13 serving as a storage means used as a word memory, a display driver 14 for driving/controlling the display unit 2, an IC card driving voltage converter 15, and various keys 16 including the select keys 20*a* and 20*b*, the enter key 4, and the exit key 5.

The RAM 13 has areas of a display buffer x, an input digit counter y, and a determined numerical value buffer z (to be described later).

Figure 15:
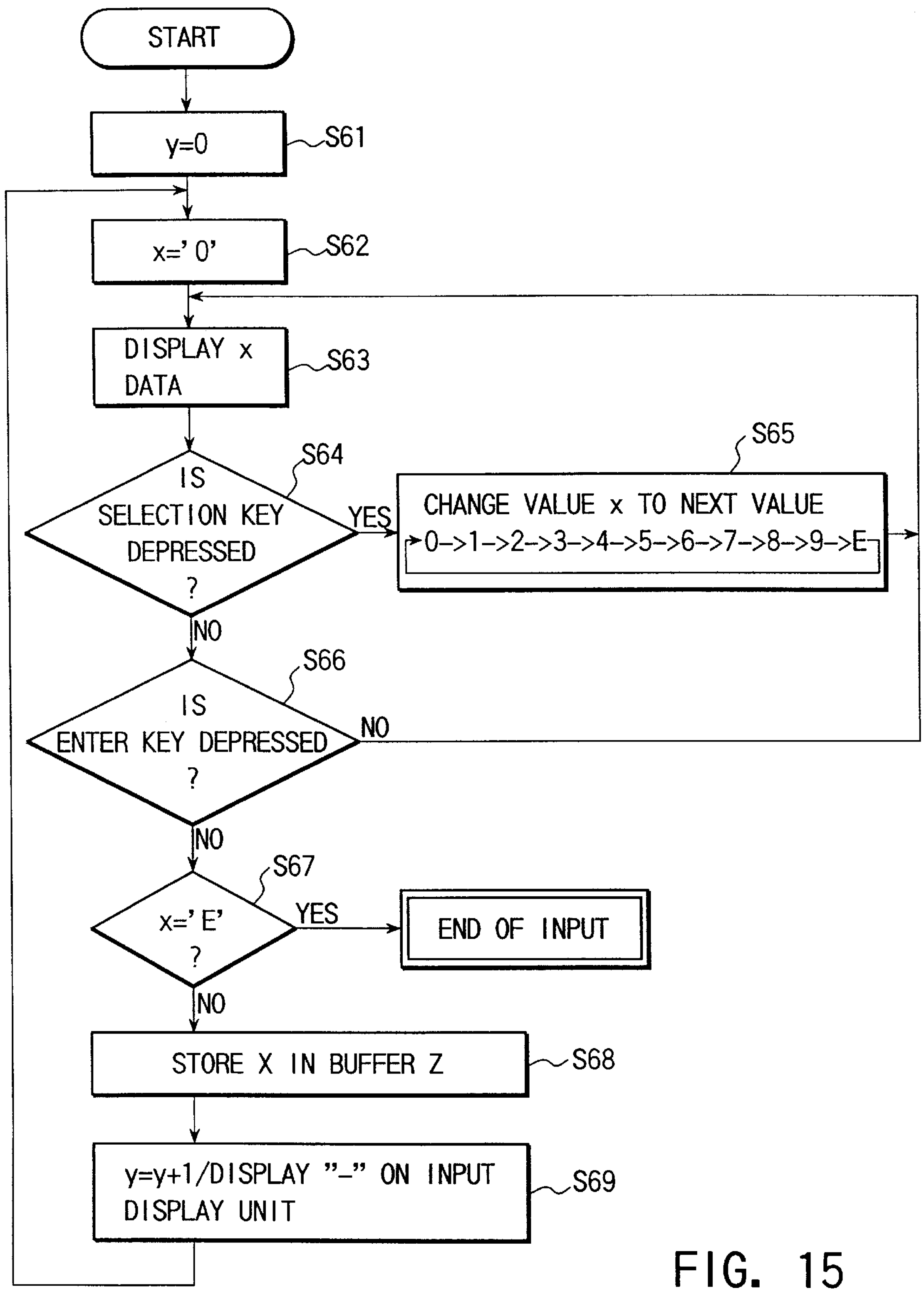
FIG. 15 is a flow chart for explaining a password data input method according to the third embodiment of the present invention.
Figure 16:
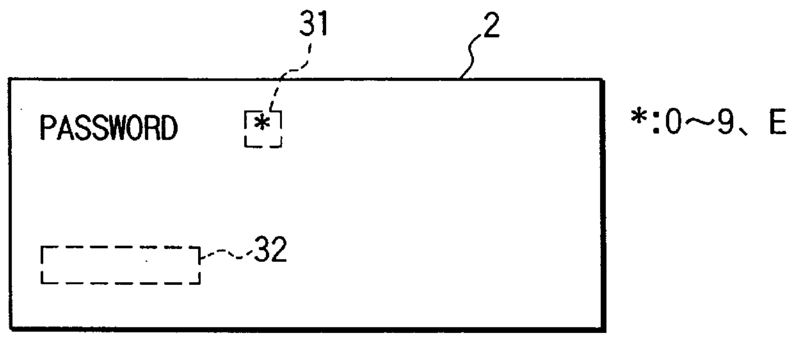
FIG. 16 is a view showing an example of the display screen of a display unit so as to explain the password data input method.
Figure 17:
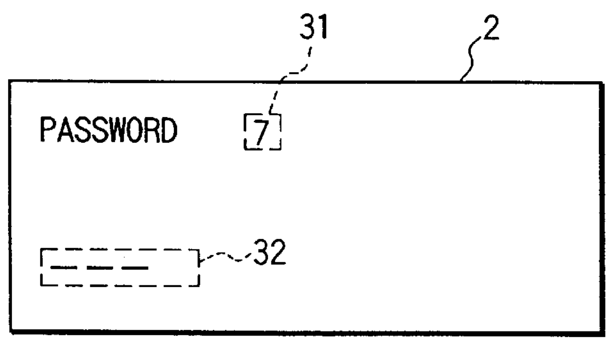
FIG. 17 is a view showing an example of the display screen of the display unit so as to explain the password data input method.
Figure 18:
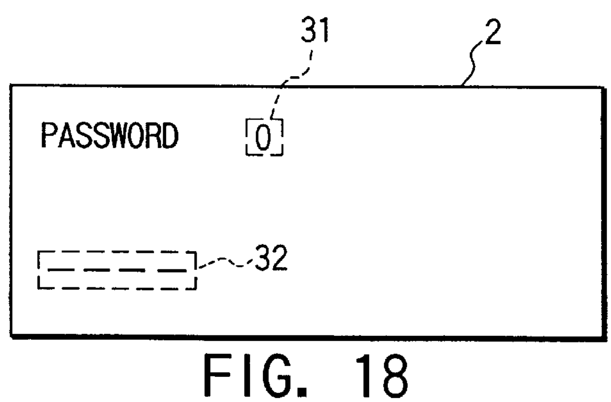
FIG. 18 is a view showing an example of the display screen of the display unit so as to explain the password data input method.
Figure 20:
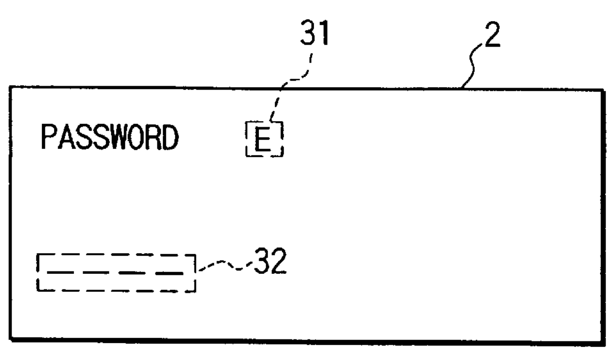
FIG. 20 is a view showing an example of the display screen of a display unit so as to explain the password data input method.

A password input method according to the third embodiment will be described below with reference to FIGS. 15 to 18. FIG. 15 is a flow chart showing the password input operation of the third embodiment. FIGS. 16 to 18 show the display screens of the display unit 2 in the password input mode.

As shown in FIG. 16, one of characters with a ring structure including numbers "0" to "9" and a specific character "E" representing the end of input is sequentially displayed in a first specific area (indicated by *) 31 of the display unit 2. When the password input screen shown in FIG. 16 is displayed, an initial value "0" is simultaneously displayed. Every time the select key 20*a* is depressed, the displayed value sequentially changes in the ascending order of "0→1→2→3→4→5→6→7→8→9→E→ . . . ." When the select key 20*b* is depressed, the displayed value sequentially changes in the descending order of "0→E→9→8→7→6→5→4→3→2→1→0→ . . . ."

After a desired character is selected using the select keys 20*a* and 20*b*, the enter key 4 is depressed. With this operation, the selected numerical value (numerical value displayed in the first specific area 31) is stored in the RAM 13. When the enter key 4 is depressed, a specific symbol such as an underbar "_" representing that data of one digit is input is displayed in a second specific area 32 of the display unit 2.

A description will be made with reference to the flow chart in FIG. 15. An initial value "0" is set in the input digit counter y arranged in the RAM 13 (S61). The initial value "0" is stored in the display buffer x arranged in the RAM 13 to store a displayed character (S62). Thereafter, the content "0" of the display buffer x is displayed in the first specific area 31 of the display unit 2 (S63).

When the select key 20*a* or 20*b* is depressed (S64), the displayed character is sequentially stored in the display buffer x in the order of "0→1→2→3→4→→5→6→7→8→9→E→0 . . . ." or "0E→9 →8→7→6→5→4→3→2→1→0→ . . . ." (S65).

After the desired character is selected using the select keys 20*a* and 20*b*, the enter key 4 is depressed (S66). It is determined whether the value of the display buffer x is the character "E" representing the Fend of input (S67). If NO in step S67, the selected character (the value of the display buffer x, which is displayed in the first specific area 31), is stored in the defined numerical value buffer z (S68). The underbar "_" is displayed in the second specific area 32 of the display unit 2, and at the same time, the value of the input digit counter y is incremented by one (S69). The flow returns to step S62 to repeat the operation in steps S62 to S69. If YES in step S67, it is determined at this time point that the input operation is complete so that the input password is determined.

In FIG. 17, the password is input up to the third digit, and the fourth digit is to be input next. In this case, assume that numerical values "1", "3 ", and "5" are input to the first to third digits, respectively. When the enter key 4 is depressed for the displayed content shown in FIG. 17, a numerical value "7" is input, and "_" is displayed at the fourth digit of the second specific area 32, so that the display screen of the display unit 2 changes to that shown in FIG. 18.

Upon depressing the enter key 4, the displayed content of the first specific area 31 is automatically restored to the initial value "0". At this time point, the specific character "E" representing the end of data input is selected by the select key 20*a* or 20*b*. The values of the input password are "11 , 3, 5, 7". These values are determined as the input password.

Assume that the password has four or more digits. In this case, after the displayed content of the first specific area 31 returns to "0", the password may be input digit by digit by the same operation, and the character "E" may be finally input.

As described above, according to the third embodiment of the present invention, when the password for key verification is to be input, the displayed value changes every time the select key 20*a* or 20*b* is depressed. When the enter key 4 is depressed, the displayed value at that time is stored in the RAM. The operation using the select keys 20*a* and 20*b* and the enter key 4 is repeated to input a password having a plurality of digits for key verification. Unlike the prior art, the password can be input using a minimum number of keys (three keys in this embodiment) without using the ten-key pad. Therefore, the IC card portable terminal apparatus 1*b* can be made compact.

Figure 19:
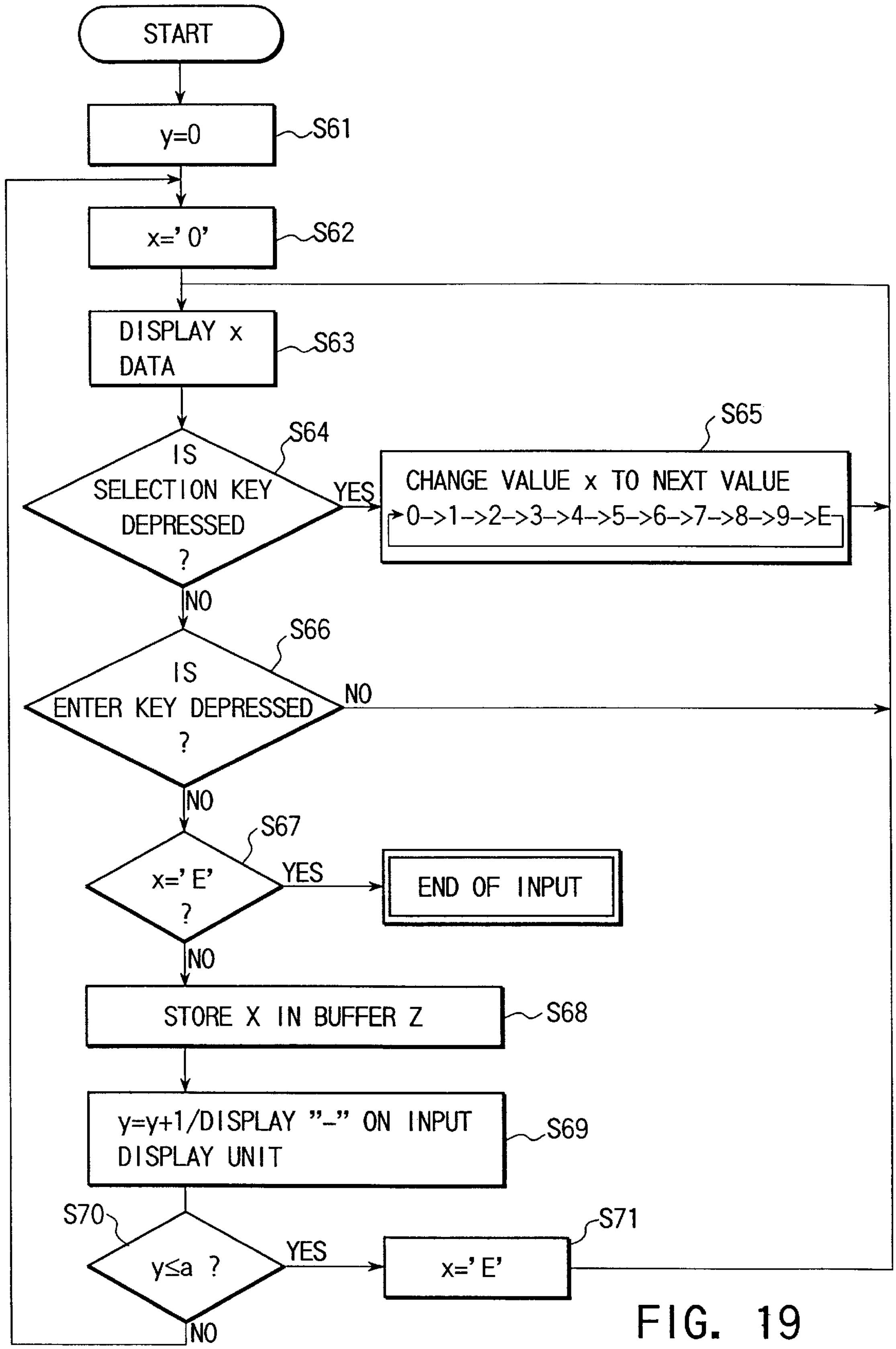
FIG. 19 is a flow chart for explaining a password data input method according to the fourth embodiment of the present invention.

The fourth embodiment of the present invention associated with password input will be described next with reference to the flow chart in FIG. 19. The processing operation in steps S61 to S69 in FIG. 19 is the same as that of the third embodiment, and a detailed description thereof will be omitted.

In the third embodiment, after the input digit counter y is incremented by one in step S69, and "_" is displayed on the display unit, the flow returns to step S61. In the fourth embodiment, the number of input digits is determined.

More specifically, in step S70, the value of an input digit counter y is checked. If the value is equal to or larger than an input digit reference value a (e.g., 4) which is set and stored in a RAM 13 in advance, the value of a display buffer x is set at a character "E" representing the end of input (S71), and the flow returns to step S63. If the value of the input digit counter y is smaller than the input digit reference value a, the flow returns to step S62 to repeat the above-described operation.

An explanation will be made with reference to the display screen of a display unit 2. Assume that the password has been input up to the third digit, and the fourth digit is about to be input, as shown in FIG. 17. Assume also that numerical values "1", "3", and "5" have been input as the first to third digits, respectively, as described above. When an enter key 4 is depressed for the displayed content in FIG. 17, a numerical value "7" is input, and "_" is displayed at the fourth digit of a second specific area 32. The display screen of the display unit 2 changes to that shown in FIG. 18. Next, the fifth digit is input. In this case, however, since the input digit reference value a is 4, the displayed content in a first specific area 31 is forcibly set to the character "E" representing the end of input. When the enter key 4 is depressed, the values "1, 3, 5, 7" are determined as the input password.

According to this embodiment, when the number of input digits of the password reaches a predetermined input digit reference value, the specific character "E" representing the end of input is displayed on the display unit 2. When a password having a predetermined number of digits is input, the user is notified that the password input operation can be ended. Therefore, the password can be easily and quickly input and determined.

In the above-described embodiment, two select keys in the count up and down directions are used. However, the number of select keys need not always be two and may be one. In this case, since the password can be input using two keys, the size of the apparatus can be further reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An IC card terminal apparatus which receives an IC card having a plurality of applications and storing data of the plurality of applications, reads out the data from said received IC card, and displays the readout data, comprising:

application table means for storing password identification information for identifying passwords of the plurality of applications;

password input means for inputting a password necessary to read out the data stored in said IC card;

current password information storage means for storing the password input using said password input means in a previous password verification operation and password identification information of the password;

selection means for selecting one of the plurality of applications;

comparison means for comparing the password identification information in said current password information storage means with password identification information in said application table means, the password identification information corresponding to the application selected by said selection means;

verification control means for, when comparison by said comparison means indicates that the two password identification information match, causing the received IC card to verify the passwords on the basis of the password in said current password information storage means;

read means for, when the passwords verified by said verification control means normally match each other, reading out the data of the application selected by said selection means from said received IC card; and display means for displaying the data read out by said read means.

2. An apparatus according to claim 1, further comprising:

check means for checking whether the password identification information is present in said current password information storage means when an application is selected by said selection means, and wherein said comparison means has means for comparing the two password identification information when check by said check means reveals that the password identification information is present in said current password information storage means.

3. An apparatus according to claim 2, wherein said application table means has means for storing, for each application, password input information defining whether a password is to be input every time data stored in said IC card is to be read out, and said check means has means for, when an application is selected by said selection means, checking the password input information in said application table means, the password input information corresponding to the selected application, and checking whether the password identification information is present in said current password information storage means when the password input information defines that a password is not to be input every time.

4. An apparatus according to claim 2, further comprising:

means for clearing storage contents of said current password information storage means upon turning on a power supply of said apparatus.

5. An apparatus according to claim 2, wherein said application table means has means for starting, for each application, clear control information defining whether contents of said current password information storage means are to be cleared upon turning on a power supply of said apparatus, said apparatus further comprising:

means for checking the clear control information in said application table means upon turning on said power supply of said apparatus, the clear control information corresponding to the password identification information in said current password information storage means, and means for clearing the contents of said current password information storage means when the corresponding clear control information represents that the contents are to be cleared.

6. An apparatus according to claim 1, further comprising:

password input control means for inputting a password using said password input means when comparison by said comparison means indicated that the two password identification information do not match; and storage control means for storing, in said current password information storage means, the password input by said password input control means and the password identification information in said application table means, the password identification information corresponding to the application selected by said selection means, and wherein said verification control means has means for, when the password and the password identification information of the password are stored in said current password information storage means by said storage control means, causing the received IC card to verify the passwords on the basis of the password in said current password information storage means.

7. An apparatus according to claim 6, wherein said password input control means has means for inputting the password using said password input means when check by said check means reveals that the password identification information is not present in said current password information storage means.

8. An apparatus according to claim 1, further comprising:

application name read means for reading out application names of the plurality of applications supported by said IC card from the received IC card, and wherein said selection means has means for selecting one of the plurality of application names read out by said application name read means.

9. An apparatus according to claim 8, wherein said data read means has means for forming a read command using an application identifier corresponding to the application selected by said selection means and transmitting the read command to said IC card.

10. An apparatus according to claim 1, further comprising:

display means for displaying a character;

first and second keys; and password storage means for storing the password input by said password input means, and wherein said password input means has means for displaying an initial value on said display means first, changing the displayed value every time said first key is depressed, storing the displayed value in said password storage means when said second key is depressed after depressing said first key, and inputting a password having a plurality of digits for the received IC card by repeating the operation using said first and second keys.

11. An apparatus according to claim 10, wherein said first key comprises a first select key for changing the displayed value to a succeeding value and a second select key for changing the displayed value to a preceding value.

12. An apparatus according to claim 10, wherein said password input means has determination means for determining the end of password input when a specific value is input.

13. An apparatus according to claim 10, wherein said password input means has means for, when the number of digits of the input password reaches a predetermined number of digits set in advance, displaying a specific character representing an end of input on said display means.

14. A password verification method for an IC card terminal apparatus which receives an IC card having a plurality of applications and storing data of the plurality of applications, reads out the data from said received IC card, and displays the readout data, comprising the step of:

storing password identification information for identifying passwords of the plurality of applications in an application table;

storing a password input in a previous password verification operation and password identification information of the password in a current password storage unit;

selecting one of the plurality of applications;

checking whether the password identification information is present in said current password information storage unit when the application is selected in the selection step;

when check reveals that the password identification information is present in said current password information storage unit, comparing the password identification information in said current password information storage unit with password identification information in said application table, the password identification information corresponding to the application selected in the selection step;

when comparison in the comparison step indicates that the two password identification information match, causing the received IC card to verify the passwords on the basis of the password in said current password information storage unit;

when the passwords verified in the step of causing to perform verification normally match each other, reading out the data of the application selected in the selection step from said received IC card; and displaying the data read out in the read step.

15. A method according to claim 14, further comprising the steps of:

inputting a password using password input means when comparison in the comparison step indicates that the two password identification information do not match; and storing, in said current password information storage unit, the password input in the password input step and the password identification information in said application table, the password identification information corresponding to the application selected in the selection step, and wherein the step of causing to perform verification includes, when the password and the password identification information of the password are stored in said current password information storage unit in the storage step, causing the received IC card to verify the passwords on the basis of the password in said current password information storage unit.

16. A method according to claim 14, wherein said application table stores, for each application, password input information defining whether a password is to be input every time data stored in said IC card is to be read out, and the check step includes, when an application is selected in the selection step, checking the password input information in said application table, the password input information corresponding to the selected application, and checking whether the password identification information is present in said current password information storage unit when the password input information defines that a password is not to be input every time.

17. A method according to claim 14, further comprising the step of reading out application names of the plurality of applications supported by said IC card from the received IC card, and wherein the selection step includes selecting one of the plurality of application names read out in the application name read step.

* * * * *